United States Patent
Habib

(10) Patent No.: US 7,290,128 B2
(45) Date of Patent: Oct. 30, 2007

(54) FAULT RESILIENT BOOT METHOD FOR MULTI-RAIL PROCESSORS IN A COMPUTER SYSTEM BY DISABLING PROCESSOR WITH THE FAILED VOLTAGE REGULATOR TO CONTROL REBOOTING OF THE PROCESSORS

(75) Inventor: Ahsan Habib, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 382 days.

(21) Appl. No.: 11/098,054

(22) Filed: Apr. 4, 2005

(65) Prior Publication Data

US 2006/0224906 A1   Oct. 5, 2006

(51) Int. Cl.
*G06F 15/177* (2006.01)
(52) U.S. Cl. .......................................... 713/2; 713/340
(58) Field of Classification Search .................... 713/2, 713/300, 340
See application file for complete search history.

(56) References Cited

U.S. PATENT DOCUMENTS

| | | | | |
|---|---|---|---|---|
| 5,659,748 A | * | 8/1997 | Kennedy | 713/2 |
| 5,790,850 A | * | 8/1998 | Natu | 713/2 |
| 6,122,735 A | | 9/2000 | Steiert et al. | 713/2 |
| 6,191,499 B1 | * | 2/2001 | Severson et al. | 307/31 |
| 6,496,881 B1 | * | 12/2002 | Green et al. | 710/58 |
| 6,601,165 B2 | | 7/2003 | Morrison et al. | 713/2 |
| 6,691,235 B1 | * | 2/2004 | Garcia et al. | 713/300 |
| 6,792,489 B2 | * | 9/2004 | Osburn et al. | 710/104 |
| 6,792,553 B2 | | 9/2004 | Mar et al. | 713/330 |
| 6,826,710 B2 | * | 11/2004 | Merkin et al. | 714/6 |
| 7,149,907 B2 | * | 12/2006 | McAfee et al. | 713/300 |
| 2003/0005275 A1 | * | 1/2003 | Lam | 713/2 |
| 2004/0215991 A1 | * | 10/2004 | McAfee et al. | 713/324 |

\* cited by examiner

*Primary Examiner*—Chun Cao
(74) *Attorney, Agent, or Firm*—Baker Botts L.L.P.

(57) ABSTRACT

Fault resilient booting of complex multi-rail processors in an information handling system insures that all processor voltage rails are functioning properly before any processor fetches operating software code. In addition, the information handling system will automatically reboot when one or more of the processors fail during either a built-in self test (BIST) or a power failure provided that there is at least one good processor remaining in the information handling system to power-on self-test (POST) the information handling system again.

20 Claims, 5 Drawing Sheets

FAULT RESILIENT BOOT METHOD FOR MULTI-RAIL PROCESSORS IN A COMPUTER SYSTEM BY DISABLING PROCESSOR WITH THE FAILED VOLTAGE REGULATOR TO CONTROL REBOOTING OF THE PROCESSORS

BACKGROUND OF THE INVENTION TECHNOLOGY

1. Field of the Invention

The present invention relates generally to information handling systems and, more particularly, to robust booting of complex multi-rail processors in the information handling system.

2. Description of the Related Art

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

An information handling system having multiprocessors may include a fault resilient boot (FRB) that provides a mechanism for automatically booting up the information handling system in the event that one or more of the processors, e.g., central processing unit (CPU), fail due to either a built-in self test (BIST) problem or power-up fault (failure) during a power-on self-test (POST), so long as there is at least one functioning processor remaining in the information handling system during a subsequent POST.

A processor voltage rail type FRB may be achieved by gating the processor's system management interrupt (SMI) input with the processor's associated "Powergood" signal. The Powergood signal indicates that the necessary operating voltages to the processor have stabilized (e.g., the voltage regulators supplying the processor are functioning properly with the correct voltage outputs to the processor voltage rails). Therefore, a processor not having correct operating voltages may be kept in a disabled condition by maintaining assertion of the associated SMI# input during what would normally be a system reset de-assertion of the SMI# input to the processor. However, this is not easily implemented because the newer technology processors have multiple power rails, e.g., three or more separate power rails. The CPU Vcore power rail may be the only rail that is specific to a particular processor, whereas the rest of the power rails may be commonly shared between the plurality of processors, e.g., VTT, Vcache for the L3 cache, etc.

When the processors share multiple common power rails, in order to ensure that all of the processor power rails are functioning properly before any of the processors begin fetching program code, a "System Powergood" may utilize AND logic to insure that all processors have properly powered-up. However, the AND logic becomes complicated when a rail to a processor is not functioning properly and thereby requires masking the Powergood signal of the processor having the faulty voltage rail.

SUMMARY OF THE INVENTION

The present invention remedies the shortcomings of the prior art by providing a system, method and apparatus for fault resilient booting of complex multi-rail processors in an information handling system that insures that all processor voltage rails are functioning properly before any processor fetches operating software code. In addition, the information handling system will automatically reboot when one or more of the processors fail during either a built-in self test (BIST) or a power failure provided that there is at least one good processor remaining in the information handling system to power-on self-test (POST) the information handling system again.

According to a specific embodiment of the present invention, the following steps may be performed:

1) clear processor DC-to-DC regulator failure status for all processors of the information handling system upon initial system power-up;

2) set FRB_ENABLE when PS_ON# is asserted, FRB_ENABLE remains lathed until PS_ON# is de-asserted;

3) when the FRB_ENABLE is set and the PS_ON# is still asserted, then upon a processor's DC-to-DC regulator failure, the associated processor's DC-to-DC regulator status is set as a failure status on the falling edge of the associated processor's Powergood signal and this failure status is not cleared until the next AC power cycle;

4) if no processor DC-to-DC regulator status is set as a failure, then all processor Powergood signals go directly to SYSTEM_POWERGOOD generation AND logic;

5) if at least one processor DC-to-DC regulator status is set as a failure, then the associated processor Powergood signal is masked by forcing it good (e.g., HIGH) to the SYSTEM_POWERGOOD generation AND logic; and 6) as soon as the processor Powergood signal of the failed processor DC-to-DC regulator is masked, the information handling system will reboot with the remaining processors having good DC-to-DC regulators, and the processor having the failed DC-to-DC regulator is disabled.

A technical advantage of the present invention is ensuring that all processor voltage rails are functioning properly before any processor fetches operating software code. Still another technical advantage is automatic booting of an information handling system when one or more processors fail due to either built-in self test (BIST) or power failure provided that there is at least one good processor remaining in the information handling system to power-on self-test (POST) again. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein.

Figure 1:
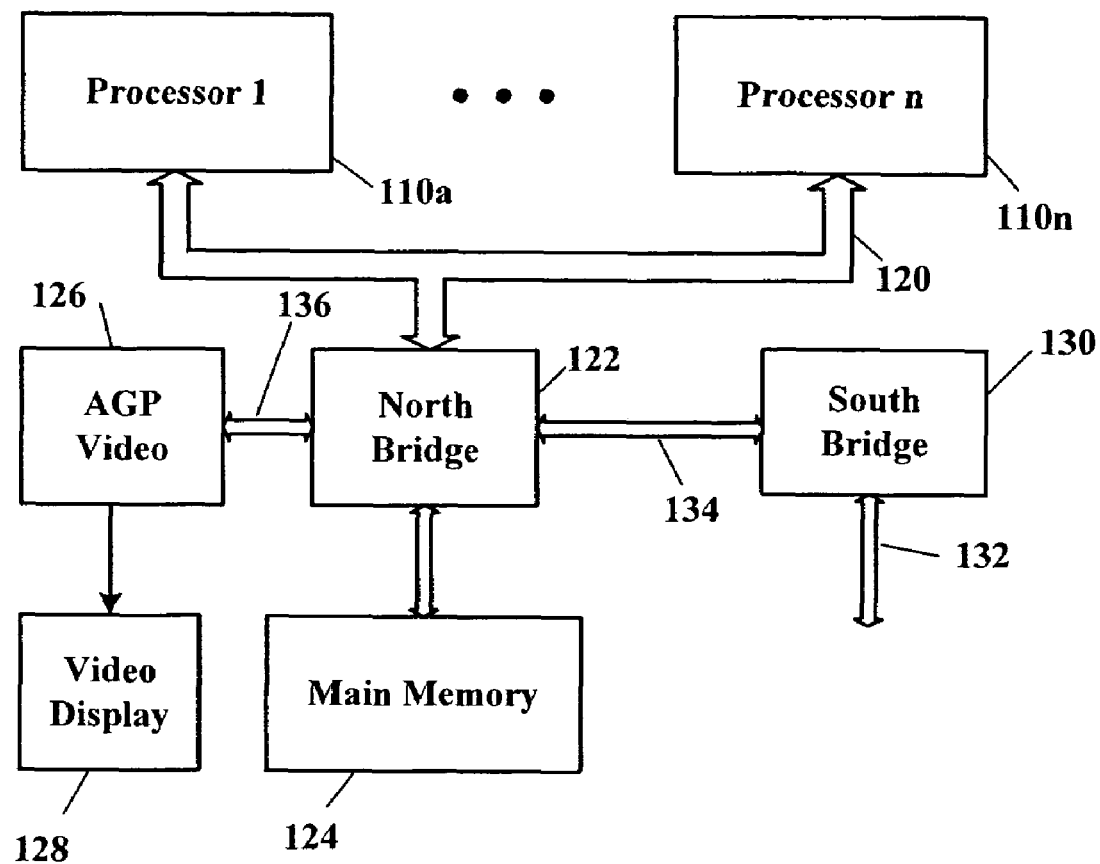
FIG. 1 is a schematic block diagram of an exemplary embodiment of an information handling system; according to teachings of the present disclosure.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific exemplary embodiments of the present invention are schematically illustrated. Like elements in the drawings will be represented by like numbers, and similar elements will be represented by like numbers with a different lower case letter suffix.

Referring to FIG. 1, depicted is an information handling system having electronic components mounted on at least one printed circuit board (PCB) (motherboard) and communicating data and control signals therebetween over signal buses. In one embodiment, the information handling system is a computer system. The information handling system, generally referenced by the numeral 100, comprises a plurality of processors 110 coupled to a host bus(es) 120. A north bridge 122, which may also be referred to as a memory controller hub or a memory controller, is coupled to a main system memory 124. The north bridge 122 is coupled to the system processors 110 via the host bus(es) 120. The north bridge 122 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 122. The chip set may also be packaged as an application specific integrated circuit (ASIC). The north bridge 122 typically includes functionality to couple the main system memory 124 to other devices within the information handling system 100. Thus, memory controller functions such as main memory control functions typically reside in the north bridge 122. In addition, the north bridge 122 provides bus control to handle transfers between the host bus 120 and a second bus(es), e.g., PCI bus 134, AGP bus 136 coupled to a video graphics interface 126 which drives a video display 128. A third bus(es) 132 may also comprise other industry standard buses or proprietary buses, e.g., ISA, SCSI, I²C, SPI, USB buses through a south bridge(s) (bus interface) 130.

Figure 2:
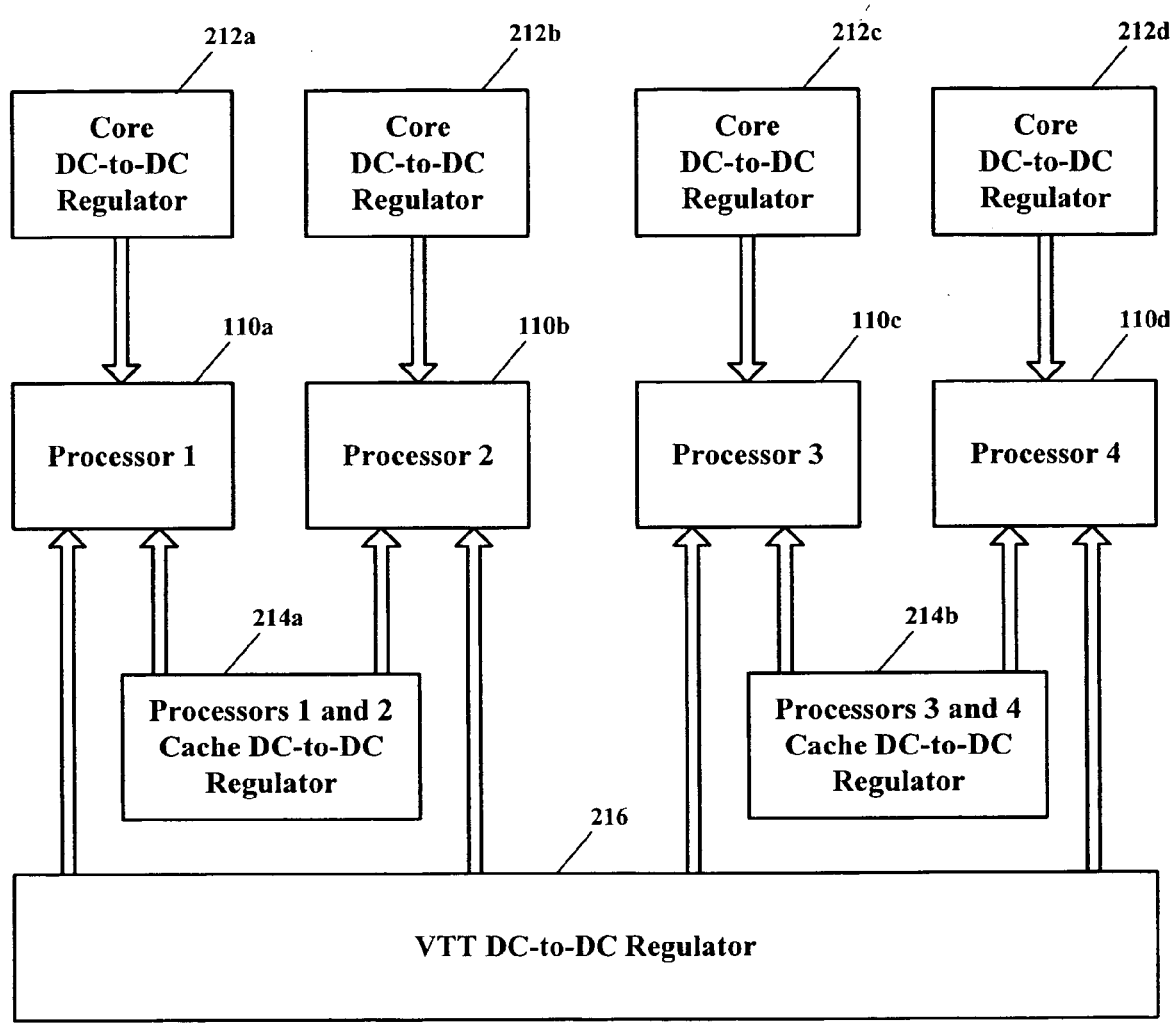
FIG. 2 is a schematic block diagram of DC-to-DC regulators coupled to the multi-processors used in the information handling system illustrated in FIG. 1.

Referring to FIG. 2, depicted is a schematic block diagram of DC-to-DC regulators coupled to the multi-processors used in the information handling system illustrated in FIG. 1. Each processor 110 requires various operating voltages that may be derived from different DC-to-DC regulators. Each processor 110 may have a dedicated DC-to-DC regulator 212, e.g., for the processor CPU core, common to some of the processors 110 DC-to-DC regulators 214, e.g., for cache memories of some of the processors, and common system DC-to-DC regulator 216, e.g., VTT for all of the processors. The information handling system 100 may function at reduced capacity and/or speed when one or more of the processors 110 fail. Generally, a processor 110 will fail if it does not receive correct operating voltages from the associated DC-to-DC regulators. If a dedicated DC-to-DC regulator 212 should fail then only the one associated processor 110 becomes non-functional. If any of the other DC-to-DC regulators should fail, the processors 110 coupled thereto and receiving voltages therefrom will become non-functional. However, so long as there is at least one processor 110 that is coupled to functional DC-to-DC regulators, the information handling system 100 may function. For purposes of description in this disclosure signals called "Powergood" or "DC2DC_PWRGD" will be used to indicate that all power supply voltages to a processor have stabilized, e.g., there are correct voltage rail values required by the processor (CPU) 110.

Figure 3:
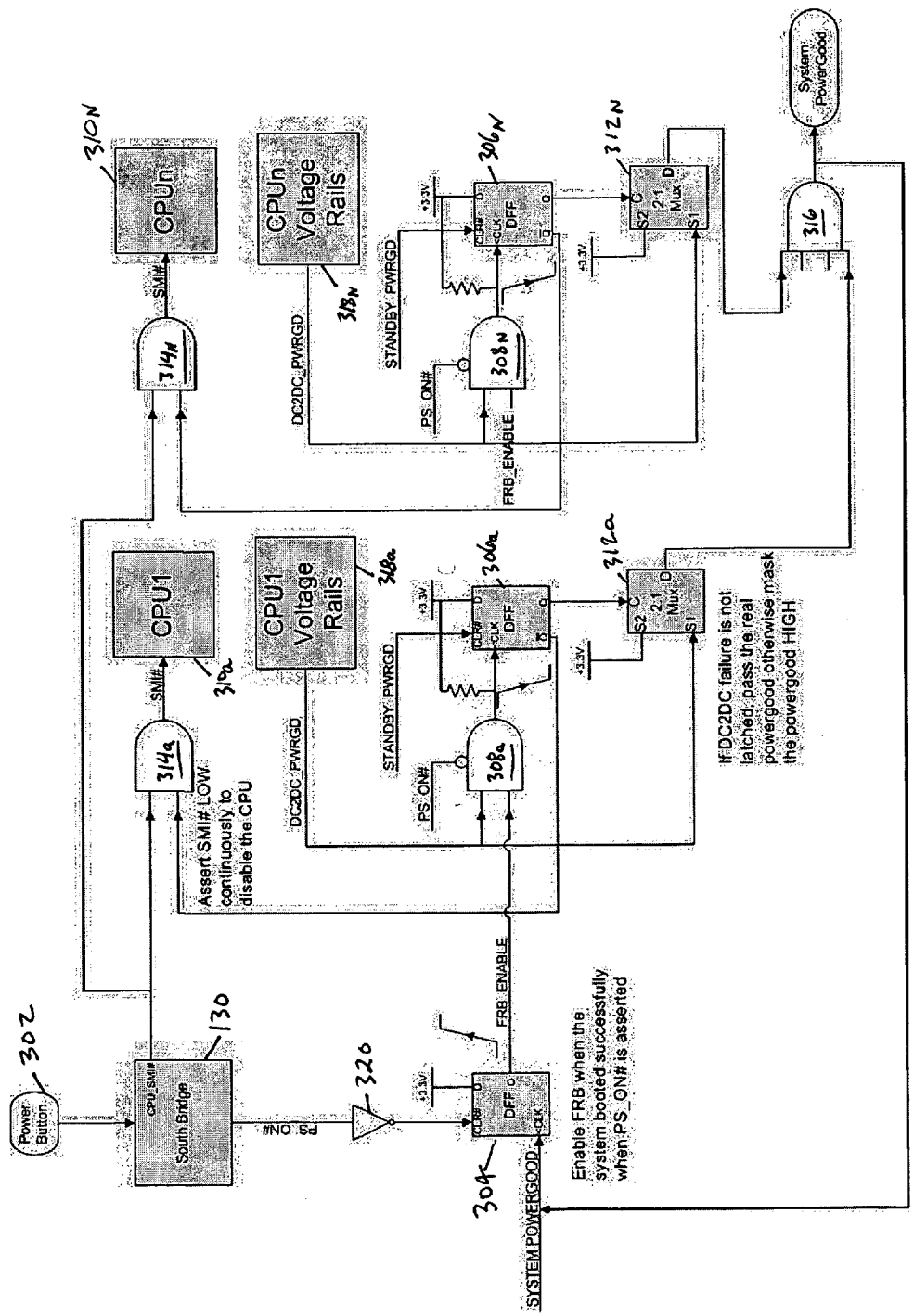
FIG. 3 is a schematic diagram of a specific embodiment of a fault resilient boot circuit in a multi-processor information handling system, according to teachings of the present disclosure.
Figure 4:
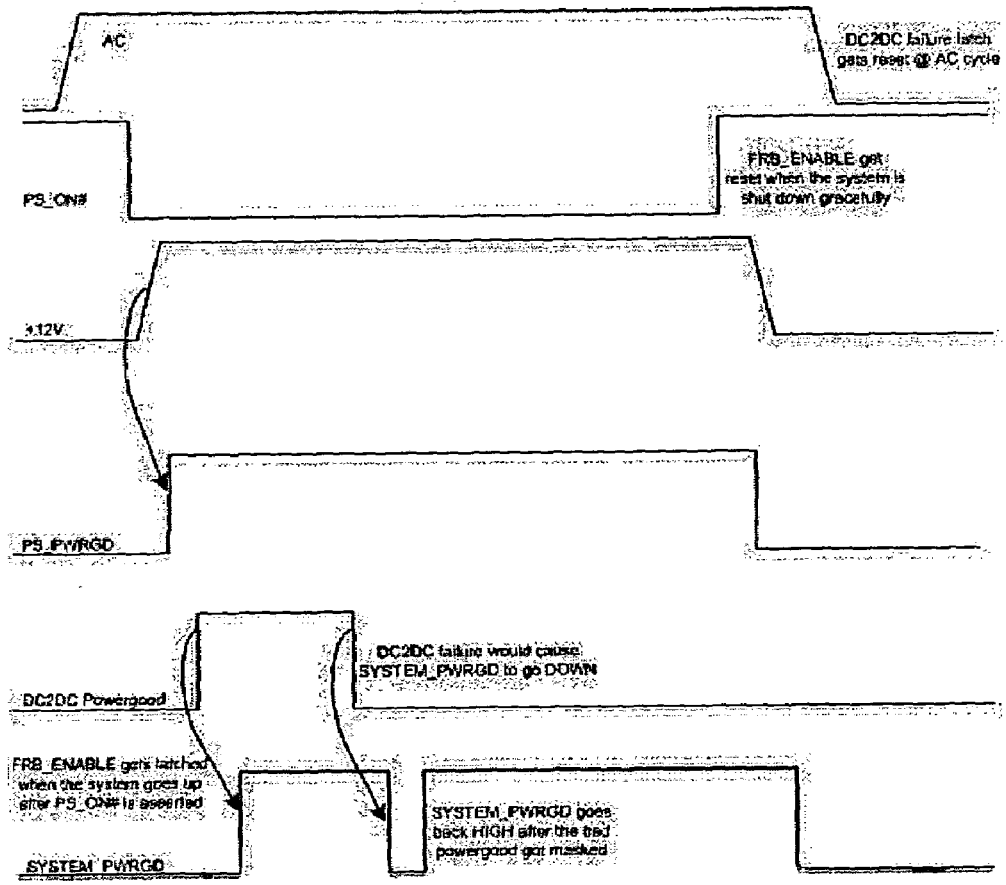
FIG. 4 is a schematic timing diagram of the fault resilient boot circuit illustrated in FIG. 3.

Referring now to FIGS. 3 and 4, wherein FIG. 3 depicts a schematic diagram of a specific embodiment of a fault resilient boot circuit in a multi-processor information handling system, according to teachings of the present disclosure, and FIG. 4 depicts a schematic timing diagram of the fault resilient boot circuit illustrated in FIG. 3. When a power button 302 is activated so as to turn on the information handling system 100 (connects AC power to the power supply system—not shown), the south bridge 130 asserts a PS_ON# signal low (FIG. 4) to indicate that the power supply system has been activated. The south bridge 130 may also assert a CPU_SMI# low to disable all CPUs 310 of the processors 110 until voltages to the CPUs 310 have stabilized. The STANDBY PWRGD signal may clear all of the D flip-flops 306 (Q-output at logic low). There may be a plurality of CPUs 310, e.g., from 2 to n, where n is a positive integer number greater than 2.

Upon initial AC power up of the information handling system 100, a D flip-flop 304 is held in clear (CLR#) through the inverter 320 until the PS_ON# signal is low (e.g., logic level 0) then whenever a SYSTEM POWERGOOD signal, coupled to the clock input of the D flip-flop 304, goes high the FRB_ENABLE signal goes from a low to a high logic level. However, the SYSTEM POWERGOOD signal will not go high until all inputs to the AND gate 316 are high. Therefore, until the FRB_ENABLE signal goes high, clock inputs to the D flip-flops 306 remain low. So long as the clock inputs of the D flip-flops 306 remain low, the multiplexers 312 couple the DC2DC_PWRGD signals to the inputs of the AND gate 316. When all of the DC2DC_PWRGD signals go high, the output of the AND gate 316 produces the SYSTEM POWERGOOD signal at a high logic level (SYSTEM_PWRGD FIG. 4). Upon the POWERGOOD signal going high, the Q output of the D flip-flop 304 asserts a logic high for the FRB_ENABLE signal.

Once the FRB_ENABLE signal is high, AND gates 308 are enabled for receiving any level change of the DC2DC_PWRGD signals from each of the respective CPU voltage rails 318. The clock input to the D flip-flop 306 is high when both the FRB_ENABLE and DC2DC_PWRGD signals are high. If the clock input to the D flip-flop 306 goes low because of a DC2DC_PWRGD signal going low (indicating a voltage rail failure), then the Q output of the D flip-flop 306 goes high. When a DC2DC_PWRGD signal goes low, the SYSTEM POWERGOOD signal will also go low (see FIG. 4). However, according to this specific embodiment, the D flip-flop 306 coupled to a DC2DC_PWRGD signal going low to the clock input of the D flip-flop 306 will cause its Q output to go high, thereby causing the multiplexer 312 to couple a logic high to the input of AND gate 316. The Q-not output of this D flip-flop 306 will go low and will cause the respective CPU 310 SMI# signal to remain low which thereby continuously disables the respective CPU 310. The information handling system 100 fault resilient boot (FRB) program will now automatically reboot the processors 110, but with the processor(s) 110 having the faulty voltage rail 318 remaining disabled. Thus, so long as there is at least one DC2DC_PWRGD signal high from a good voltage rail 318, the information handling system 100 will reboot and operate, but with less processing power. The multiplexer 312 associated with a disabled CPU 310 will always force a logic high (mask the DC2DC_PWRGD signal at the logic low) to an input of the AND gate 316 so that the information handling system 100 may recover from a processor voltage rail fault.

Figure 5:
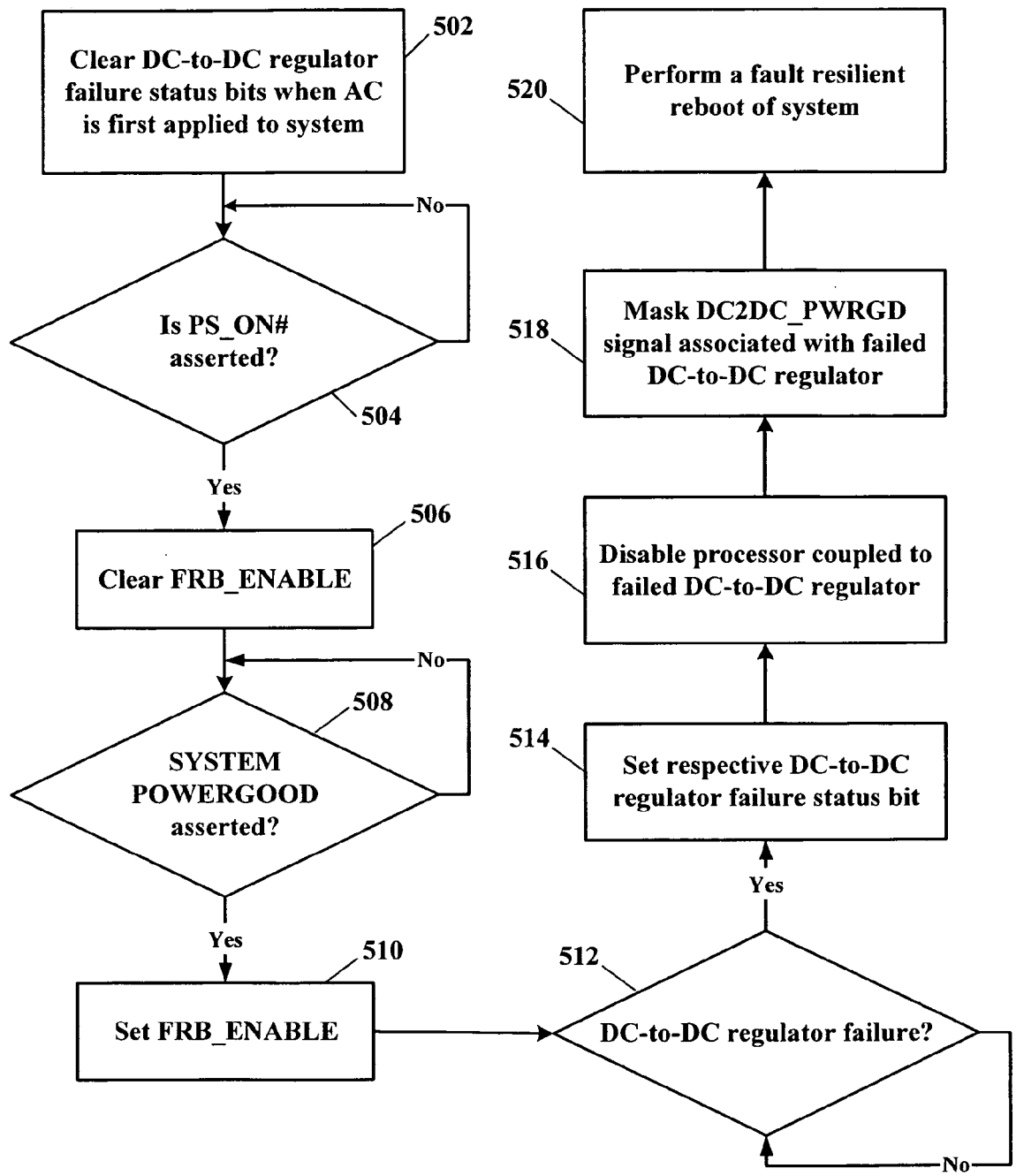
FIG. 5 is a flow diagram of the operation of a specific embodiment of the fault resilient boot, according to teachings of the present disclosure.

Referring to FIG. 5, depicted is a flow diagram of the operation of a specific embodiment of a fault resilient boot, according to teachings of the present disclosure. In step 502, DC-to-DC regulator failure status bits, e.g., register and/or digital flip-flops, are cleared when power is first applied to the information handling system. In step 504; when assertion of the PS_ON# signal is determined, the FRB_ENABLE is cleared in step 506. Step 508 determines when the SYSTEM POWERGOOD is asserted, then in step 510 the FRB_ENABLE is set. Step 512 determines when an individual DC-to-DC regulator has failed, and when the DC-to-DC regulator fails, a status bit, e.g., register or digital flip-flop, associated with the failed DC-to-DC regulator is set in step 514. In step 516, the processor associated with the failed DC-to-DC regulator is disabled, and in step 518 the DC2DC_PWRGD signal associated with the failed DC-to-DC regulator is masked. In step 520 an FRB system reboot is performed with any failed DC-to-DC regulator DC2DC_PWRGD signal masked and associated processor disabled. Thus, the information handling system will reboot with the remaining processors having good DC-to-DC regulators.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for fault resilient boot of complex multi-rail processors in an information handling system, said method comprising the steps of:

clearing processor DC-to-DC regulator failure status for all processors of an information handling system upon initial power-up;

setting FRB_ENABLE when asserting PS_ON#, wherein FRB_ENABLE remains set until PS_ON# is de-asserted;

setting a processor DC-to-DC regulator status as failed when an associated processor DC-to-DC regulator has failed;

checking all processor DC-to-DC regulator status to determine if no processor DC-to-DC regulator has failed, then coupling all processor Powergood signals directly to SYSTEM_POWERGOOD generation logic;

otherwise if at least one processor DC-to-DC regulator status is set as a failure, then masking the associated processor Powergood signal by forcing it indicate good status before coupling to the SYSTEM_POWERGOOD generation logic; and rebooting the information handling system with the remaining processors having good DC-to-DC regulators and disabling the processor having the failed DC-to-DC regulator.

2. The method according to claim 1, wherein the SYSTEM_POWERGOOD generation logic is AND logic.

3. The method according to claim 1, wherein the step of setting FRB_ENABLE comprises the step of latching the FRB_ENABLE as set until the PS_ON# is de-asserted.

4. The method according to claim 1, wherein the step of setting the processor DC-to-DC regulator status as failed comprises setting the failure status on a falling edge of the associated processor's Powergood signal.

5. The method according to claim 3, wherein the failure status is not cleared until a next AC power cycle.

6. A method for fault resilient boot of complex multi-rail processors in an information handling system, said method comprising the steps of:
 clearing processor DC-to-DC regulator failure status for all processors of an information handling system upon initial power-up;
 detecting when a PS_ON# is asserted;
 clearing a FRB_ENABLE upon detecting the asserted PS_ON# signal;
 detecting when a SYSTEM_POWERGOOD is asserted;
 setting the FRB_ENABLE upon detecting the asserted SYSTEM_POWERGOOD;
 determining if there are any DC-to-DC regulator failures;
 setting a respective status bit for each failed DC-to-DC regulator;
 disabling each processor coupled to a failed DC-to-DC regulator;
 masking the status bit for each failed DC-to-DC regulator; and
 rebooting the information handling system with only those processors coupled to good DC-to-DC regulators.

7. An information handing system having fault resilient boot of complex multi-rail processors, said system comprising:
 a plurality of processors, each of the plurality of processors having a first DC-to-DC regulator, each group of the plurality of processors having a common second DC-to-DC regulator, and all of the plurality of processors having a common third DC-to-DC regulator;
 means for clearing failure status of each of the first DC-to-DC regulators upon initial system power-up;
 means for detecting when a PS_ON# is asserted;
 means for clearing a FRB_ENABLE upon detection of the asserted PS_ON# signal;
 means for detecting when a SYSTEM_POWERGOOD signal is asserted;
 means for setting the FRB_ENABLE upon detecting the asserted SYSTEM_POWERGOOD signal;
 means for determining if there are any DC-to-DC regulator failures;
 means for setting a respective status bit for each failed DC-to-DC regulator;
 means for disabling each processor coupled to a failed DC-to-DC regulator;
 means for masking the status bit for each failed DC-to-DC regulator; and
 means for rebooting the information handling system with only those processors coupled to good DC-to-DC regulators.

8. The system according to claim 7, wherein the means for clearing failure status of each of the first DC-to-DC regulators is done with a STANDBY_PWRGD signal to clear a first bi-stable storage device associated with each of the first DC-to-DC regulators.

9. The system according to claim 7, wherein the means for detecting when the PS_ON# is asserted is done with a second bi-stable storage device.

10. The system according to claim 9, wherein the means for clearing the FRB_ENABLE upon detection of the asserted PS_ON# signal is done with the second bi-stable storage device.

11. The system according to claim 9, wherein the means for setting the FRB_ENABLE upon detecting the asserted SYSTEM_POWERGOOD signal is done with the second bi-stable storage device.

12. The system according to claim 7, wherein the means for determining if there are any DC-to-DC regulator failures is indicated with a DC2DC_PWRGD signal from each of the first DC-to-DC regulators.

13. The system according to claim 8, wherein the means for setting a respective status bit for each failed DC-to-DC regulator is done by setting the first bi-stable storage device associated with each failed DC-to-DC regulator.

14. The system according to claim 8, wherein the means for disabling each processor coupled to a failed DC-to-DC regulator is done with the first bi-stable storage device associated with each failed DC-to-DC regulator.

15. The system according to claim 8, wherein the means for masking the status bit for each failed DC-to-DC regulator is done with a multiplexer coupled to an output of the first bi-stable storage device.

16. The system according to claim 8, further comprising a power-on control coupled to south bridge logic having a CPU_SMI# output and an output for generating the PS_ON#.

17. The system according to claim 8, wherein an output from each of the first bi-stable storage devices associated with the first DC-to-DC regulators is used to control respective multiplexers, and each of the respective multiplexers is used for masking the status bit for each failed DC-to-DC regulator.

18. The system according to claim 8, wherein an output from each of the first bi-stable storage devices associated with the first DC-to-DC regulators is used with the means for disabling each processor coupled to an associated failed DC-to-DC regulator.

19. An apparatus for fault resilient boot of complex multi-rail processors in an information handing system, comprising:
 a first bi-stable storage device having a clear input coupled to the PS_ON# output of the south bridge, a clock input coupled to a SYSTEM POWERGOOD signal and an output of an FRB_ENABLE signal;
 a plurality of second bi-stable storage devices, one for each of the first DC-to-DC regulators, for storing whether the respective first DC-to-DC regulator is functioning properly;
 a plurality of multiplexers, each of the plurality of multiplexers coupled to respective ones of the plurality of second bi-stable storage devices, wherein each of the plurality of multiplexers has an output of a conditioned DC-to-DC power good signal, wherein each of the conditioned DC-to-DC power good signals is either a power good signal representing a respective functioning first DC-to-DC regulator or a masked power good signal associated with a non-functioning first DC-to-DC regulator; and
 a logic circuit for generating the SYSTEM POWERGOOD signal when all conditioned DC-to-DC power good signals indicate a first logic level, wherein the first bi-stable storage device sets the FRB_ENABLE signal when the SYSTEM POWERGOOD signal is generated, and any of the plurality of processors coupled to non-functioning first DC-to-DC regulators will be disabled before the information handling system reboots.

20. An apparatus for fault resilient boot of complex multi-rail processors in an information handing system, comprising:
 means for storing failure status of each DC-to-DC regulator associated with a processor in a multiprocessor information handling system;

means for clearing the failure status of each of the first DC-to-DC regulators upon initial system power-up;
means for detecting when a PS_ON# is asserted;
means for clearing a FRB_ENABLE upon detection of the asserted PS_ON# signal;
means for detecting when a SYSTEM_POWERGOOD signal is asserted;
means for setting the FRB_ENABLE upon detecting the asserted SYSTEM_POWERGOOD signal;
means for determining if there are any DC-to-DC regulator failures;

means for setting a status bit for each failed DC-to-DC regulator in the failure status storing means;
means for disabling each processor coupled to a failed DC-to-DC regulator;
means for masking the status bit for each failed DC-to-DC regulator; and
means for rebooting the information handling system with only those processors coupled to good DC-to-DC regulators.

* * * * *